INVENTORS
Charles P. Ginsburg
Ray M. Dolby
BY
Flehr and Swain
ATTORNEYS

INVENTORS
Charles P. Ginsburg
Ray M. Dolby

BY

Flehr and Swain
ATTORNEYS

INVENTORS
Charles P. Ginsburg
Ray M. Dolby
BY
Flehr and Swain
ATTORNEYS

Jan. 17, 1961

C. P. GINSBURG ET AL

ELECTRONIC SWITCHING SYSTEM FOR MAGNETIC RECORDER AND/OR REPRODUCER 2,968,692

Filed Oct. 8, 1956

5 Sheets-Sheet 4

INVENTORS
Charles P. Ginsburg
Ray M. Dolby

BY

Flehr and Swain

ATTORNEYS

INVENTORS
Charles P. Ginsburg
Ray M. Dolby
BY
Flehr and Swain
ATTORNEYS 2,968,692

ELECTRONIC SWITCHING SYSTEM FOR MAGNETIC RECORDER AND/OR REPRODUCER

Charles P. Ginsburg, Los Altos, and Ray M. Dolby, Cupertino, Calif., assignors to Ampex Corporation, Redwood City, Calif., a corporation of California Filed Oct. 8, 1956, Ser. No. 614,420

20 Claims. (Cl. 178—6.6)

This invention relates generally to electrical systems and methods wherein substantially continuous signal is formed from several signal portions. More specifically it pertains to systems and methods for the reproduction of signals recorded magnetically upon a magnetic tape. The invention is applicable to reproduction of signal intelligence having a wide frequency spectrum including, for example, video frequencies.

Systems have been developed which make use of a rotary head assembly for magnetically recording and/or reproducing signals over a wide frequency spectrum. One practical use for such a system is the recording and reproduction of television programs. The rotary assembly employed has several electromagnetic heads that are mounted to rotate and sweep across separate track portions on the tape. For best reproduction of the recorded track portions it is desirable to provide switching means whereby the reproduced signal portions are combined to form a substantially continuous output signal. Systems and methods of the type just described, suitable for the recording and reproduction of television programs, are disclosed in copending applications Serial No. 427,138, filed May 3, 1954, now Patent No. 2,916,546, Serial No. 506182, filed May 5, 1955, Serial No. 524,004, filed July 25, 1955, and Serial No. 552,868, filed December 13, 1955, now Patent No. 2,921,990.

In general, it is an object of the present invention to provide a system and method of the above character in which the switching operations are carried out in a novel manner to overcome certain disadvantages of earlier systems and methods.

Another object of the invention is to provide a system and method of the above character in which the switching interval can be reduced to such an extent as to be negligible insofar as the resulting continuous signal is concerned.

Another object of the invention is to provide a system and method of the above character in which the switching operations can be controlled in point of time, whereby one may correlate the switching time with respect to the separate signal portions.

Another object of the invention is to provide a system and method of the above character in which the demodulated combined output signal contains peaks representing time pulses, and in which triggering pulses derived from such peaks are used for controlling the switching operations.

Another object of the invention is to provide a switching system and method of the above character which makes possible an improvement with respect to the signal-to-noise ratio.

Another object of the invention is to provide a system and method which controls electronic switching devices by both preliminary gating waves and switching pulses.

Additional objects and features of the invention will appear from the following description in which the preferred embodiments have been set forth in detail in conjunction with the accompanying drawings.

Referring to the drawing.

Figure 6A–I shows waveforms at various points in the system.

Figure 7:
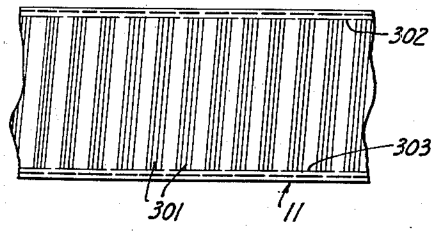

Figure 7 schematically illustrates a portion of the tape with record areas thereon.

Figure 8:
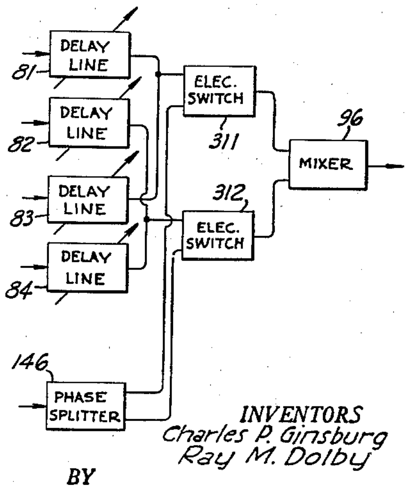

Figure 8 is a block diagram schematically illustrating another embodiment.

Figure 1:
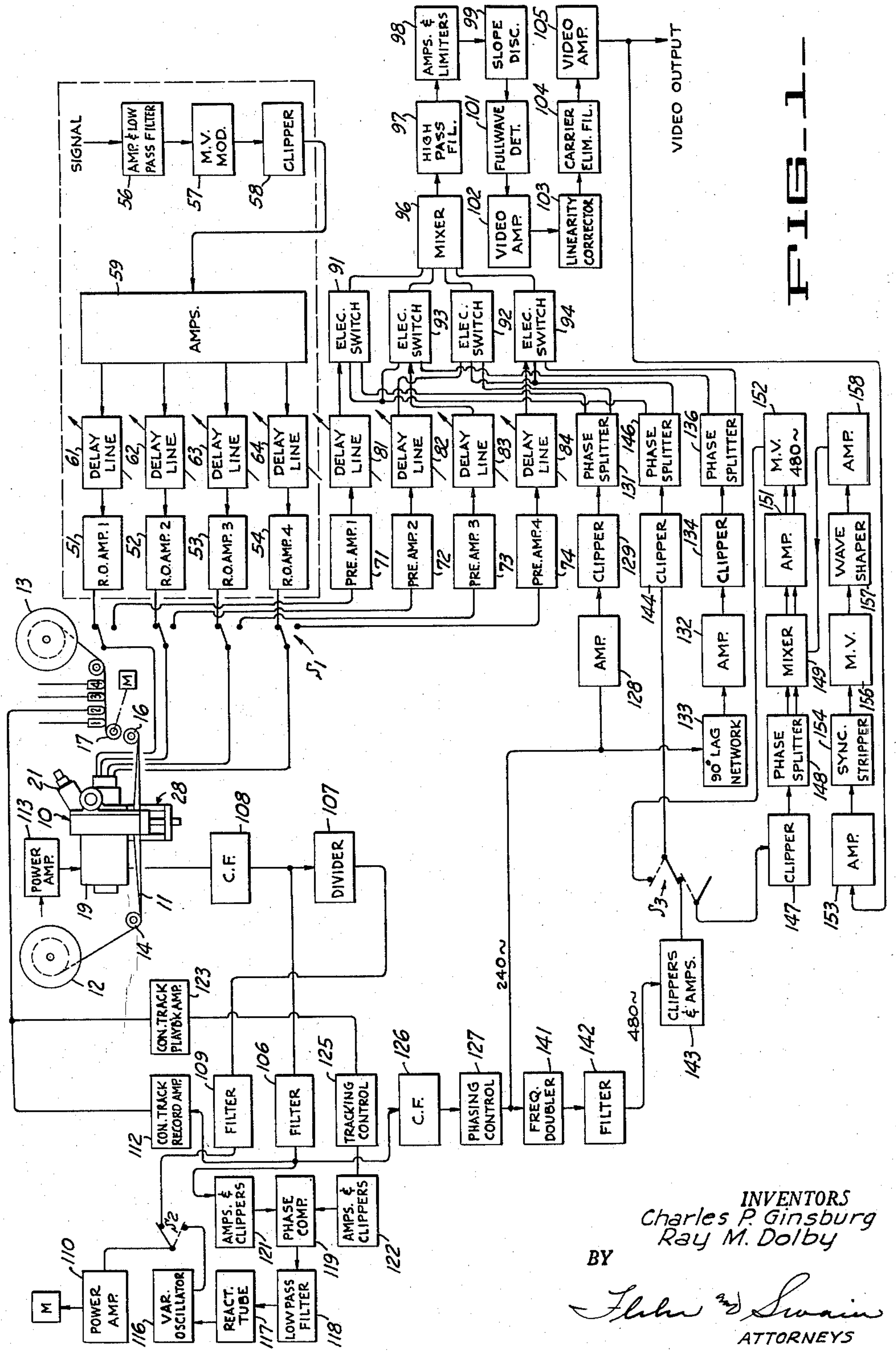
Figure 1 is a block diagram schematically illustrating a system incorporating the present invention.

The system illustrated schematically in Figure 1 is intended for recording and/or reproducing television programs. It consists of apparatus 10 of the type having several transducer units in the form of electromagnetic units or heads that are caused to sweep successively across a magnetic tape 11, as the tape is being moved by transport means in the direction of its length. The sweep paths can be rectilinear, and a portion of the tape is cupped or curved to conform to the surface of a cylinder in the region where it is being contacted by the heads. The transport means for tape can consist of conventional supply and takeup reels 12 and 13, carried by suitable turntables. In accordance with customary practice a suitable motor can be provided for the turntable associated with reel 12 to apply constant torque to maintain proper tape tension during recording or playback. Also this motor can be energized for rewind operations. Another motor can be associated with the turntable for reel 13, to apply constant torque for tape takeup. Guide studs or rollers 14 and 16 are shown engaging the tape at spaced distances from the operating end of the head assembly. The tape also engages a driving capstan 17, and in addition may engage a number of supplemental magnetic heads 1, 2, 3, and 4 for operating upon the side margins of tape. It is assumed that the tape is of substantial width compared to a tape used with conventional magnetic sound recording equipment, and for example may have a width of the order of two inches. Its construction can be similar to magnetic tape now available on the market for sound recording, and it can consist of a thin pliable film of plastic material having a coating of magnetic material on one side of the same.

The head assembly 18 is driven by an electric motor 19. Rotary pulse generating means 21 is associated with the head assembly and serves to generate pulses having a frequency dependent upon the speed of rotation. The pulses thus generated are used for certain purposes as will be explained presently.

Figures 2, 3:
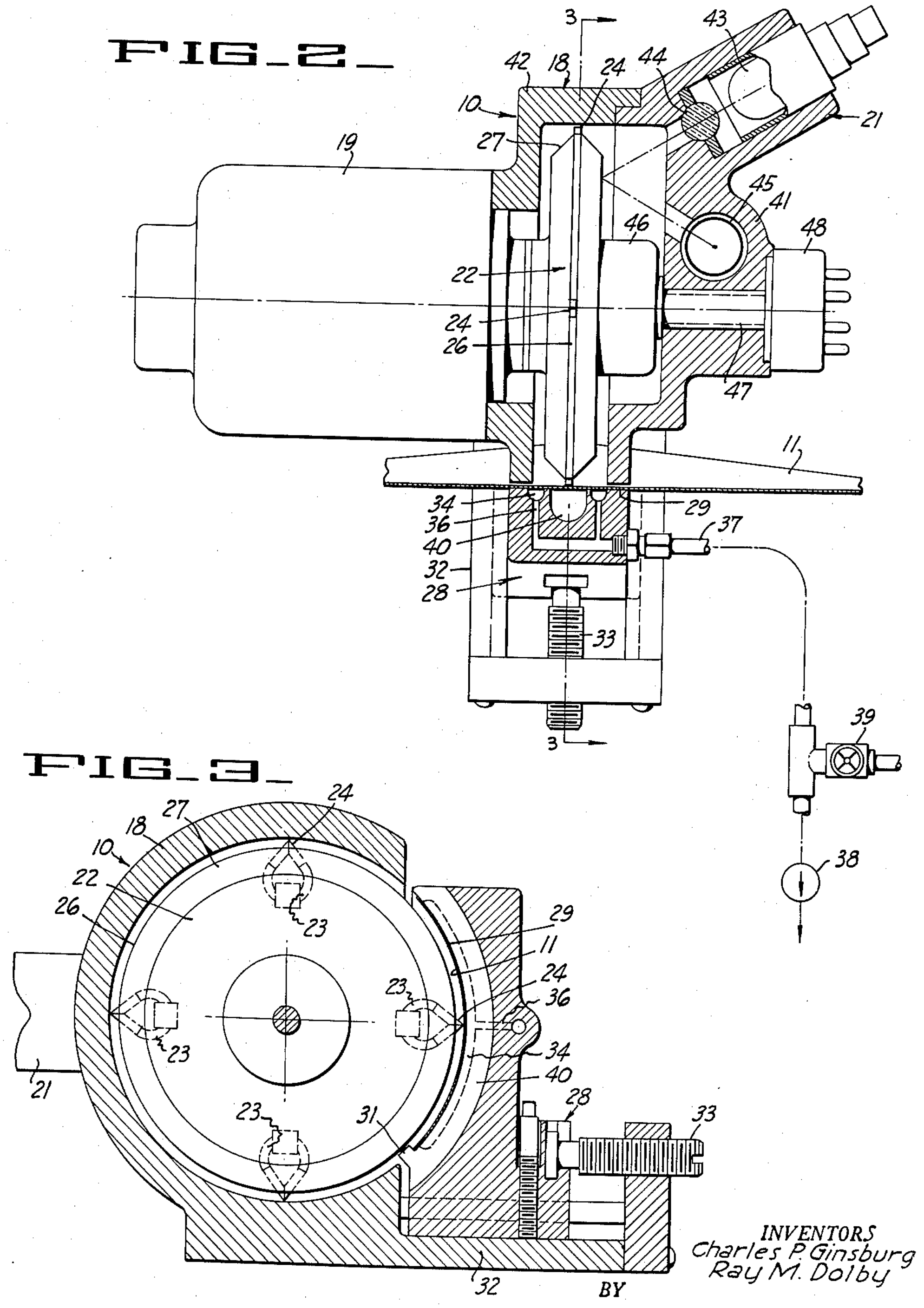
Figure 2 is a detail in section showing the rotary head assembly and associated parts.
Figure 3 is a cross sectional detail taken along the line 3—3 of Figure 2.

Suitable details for the rotary head assembly and the rotary pulse generating means are shown in Figures 2 and 3. A wheel 22 is directly mounted upon the shaft of motor 19, and carries several magnetic head units 23. Each of these units consists of a suitable magnetic core together with a core winding. Tips 24 of the units are made of relatively hard magnetic material and project a short distance from the periphery 26. Preferably the wheel is beveled as indicated at 27, whereby the peripheral surface 26 has a width corresponding generally to the width of the tips 24. The thin non-magnetic gap between the tips of each unit may be in a plane coincident with the axis of rotation and perpendicular to the plane of the wheel.

Associated with the wheel 22 there is a tape retaining or holding means 28 that holds the tape in the desired cupped condition and presents it for contact with the tips of the transducer units. As viewed in Figure 3 the holder 28 has a tape engaging surface 29 formed on an arc of a circle having the axis of the motor shaft as its center. One or more stops or shoulders 31 are provided for engaging one edge of the tape. The holder can be mounted upon a guideway 32, and provided with means such as the adjusting screw 33, whereby it may be adjusted to a desired position relative to the motor shaft. Preferably pneumatic means are employed to insure constant contact of the tape with the arcuate surface 29. Thus grooves 34 are provided which terminate short of the upper and lower ends of the arcuate surfaces 29, and which are shown connected by ducts 36 with the tube 37. This tube is connected to a source of vacuum represented by the vacuum pump 38. For a purpose to be described presently, it is preferred that the vacuum be adjustable, and this can be accomplished by providing an adjustable bleed in valve 39 connected with the line 37.

The rotary pulse generating means can be constructed as shown in Figure 2. In this instance the mounting 41 is provided which, in conjunction with the housing part 42, forms a shroud or housing for the wheel 22. A source of light such as the electric lamp 43 is focused by lens 44 upon one side of the wheel 22. Light reflected by the wheel is received by the photoelectric tube 45. One segment of the wheel is darkened, and another segment made light reflecting. The photoelectric tube can be coupled to a suitable means such as a vacuum tube cathode follower, the output of which is applied to the system as will be described presently.

Figure 3 illustrates the manner in which the magnetic tape 11 is cupped as it moves toward the wheel 22 and in contact with the curved surface 29 of the holder. The holder is recessed or cut away as indicated at 40, for the entire length of the arcuate surface 29, whereby that portion of the tape spanning this recess is contacted by the tips 24 of the transducer units. Normally the contact is with sufficient pressure to stretch slightly and indent the tape in the small localized region being contacted by a tip.

Suitable means are provided to facilitate making external connections with the several heads. Thus, suitable slip ring means (not shown in detail) can be provided within the wheel portion 46, and the leads from the same taken out through the tube 47 to the stationary terminal block 48. One terminal of each head winding can be grounded and the other terminal connected to slip ring means, which in turn connects with an individual terminal tab on block 48.

In Figure 1 the tabs of the terminal block 48 are shown connected to the changeover switch S1, which has one set of its contacts connected with the record electronics, and another set connected with reproducing or playback electronics.

The record electronics can consist of suitable means for producing a modulated carrier, together with suitable recorder amplifiers. FM recording is preferred, although AM can be used. Assuming the use of FM recording, the record electronics can include the record amplifiers 51, 52, 53, and 54, having their outputs connected to the contacts of the changeover switch S1. The signal input, which may be video frequencies, is shown being applied through the amplifier and low pass filter 56, to the multivibrator 57. The output of the multivibrator modulator 57 is applied through the clipper 58, to the amplifier 59, which has its several outputs connected with the amplifiers 51–54, through the adjustable delay lines 61–64. The clipper stage 58 serves to limit the amplitude of the signal.

The playback electronics includes the preamplifiers 71–74, which have their inputs connected to the contacts of the changeover switch S1. The outputs of the preamplifiers are connected through the delay lines 81–84, with electronic switching devices 91–94. These switching devices in turn connect with the common output mixer 96. The combined signal from the mixer 96 is applied through the high pass filter 97, to the amplifiers and limiters 98. As suitable demodulating means we have shown the output from amplifiers and limiters 98 being applied through the slope detector 99 to the detector 101, which preferably is of the full wave type. The demodulated signal from detector 101 is amplified at 102 and applied to the linearity corrector 103 and the carrier eliminator filter 104 to the video amplifier 105. The output of this amplifier provides a signal having video or other frequencies of the original signal output. Filter 97 can be constructed to prevent the passage of low frequency noise components to the slope detector 99. When the system is operated on video frequencies this filter can be made to pass only frequencies above 800 kc. The slope detector can be of the resistance-capacity type having a 6 db per octave amplitude-versus-frequency characteristic. If the slope detector is tuned, resonance should be far removed from the carrier in order to give the desired wide band response. The linearity corrector 103 likewise can be of a type known to electronic engineers. It is adjusted to provide so-called gamma correction, and introduces distortion which serves to compensate for amplitude distortions due to the use of the slope detector 99.

The electronic switching devices 91–94 are controlled by application of what can be termed preliminary gating waves, and switching waves, as will be described presently in detail.

The motor control system incorporated in Figure 1 consists of a wave shaping filter 106 and the frequency divider 107, both coupled to the rotary pulse generator 21 by cathode follower 108. The divider 107 serves to reduce the frequency of the pulses from the pulse generator to a frequency convenient for operating an alternating current motor M, which is indicated schematically for driving the tape capstan. The output of the divider 107 is shown being passed through the filter 109 and thence through switch S2 to the power amplifier 110. The output of this amplifier supplies current to the capstan driving motor M. Filters 106 and 109 may be simple LC circuits tuned to the frequency being passed, serving to shape the wave to sinusoidal form.

The frequency of the pulse generating means is recorded upon one margin of the tape as a speed control frequency. Thus the filter 106 connects with the amplifier 112, which in turn has its output applied to the head 2. This head can operate upon one margin of the tape and serves to record the control frequency.

The motor 19 for driving the head assembly is shown connected to the output of the power amplifier 113. The input of this amplifier can be supplied with a reference frequency which is not subject to wide variations. The reference frequency may be derived, for example, from the ordinary 60 cycle current supply lines or from some point within the system where a relatively constant reference frequency is available. In one particular instance a reference frequency of 240 cycles was employed.

For reproducing operations switch S2 is shifted to connect the input of the amplifier 110 to the output of the variable frequency oscillator 116. This oscillator includes the reactance tube 117 and is supplied with a controlling voltage from the phase comparator 119 through the low pass filter 118. The amplifiers and clippers 121 connect with the output of the wave shaping filter 106 and therefore receive a frequency corresponding to that generated by the rotary pulse generator 21. The amplifiers and clippers 122 connect to the output of amplifier 123, the input of which connects to the magnetic head 2.

To describe briefly the operation of the motor control system: During recording operations a frequency derived from the rotary pulse generating means is recorded as a control frequency along one margin of the tape, by virtue of the head 2.

During playback operations, the capstan motor M is under close control by virtue of the manner in which frequency of the current from power amplifier 110 is determined by the frequency of operation of the variable oscillator 116. The variable oscillator in turn is controlled by the value of the controlling voltage supplied by the phase comparator 119, and that value is determined by the phase relationship between the frequency of the rotary pulse generator and the frequency derived from the previously recorded control frequency by head 2. This causes the motor M to drive the tape past the rotary head assembly at a speed precisely the same as used during recording, and if slight variations in such speed occur during recording the same variations will be applied during playback.

Interposed between the playback amplifier 123 and the amplifiers and clippers 122, there may be a so-called tracking control 125. This can be a simple phase adjusting device, and its adjustment during operation of the system serves to bring the rotary heads into proper tracking relation with the recorded tracks on the tape. The tracking control can be pre-set to maintain a predetermined correspondence between the transducer units and the tracks during playback.

The switching means illustrated schematically in Figure 1 includes means for deriving pulses for controlling the switching devices 91–94. One set of pulses can be termed as preliminary gating pulses, in that they serve to gate on one of the grids of a vacuum tube switch (i.e. one of the 91–94) preliminary to the actual switching operation. The second set of pulses can be termed as switching or retrace switching pulses, in that they serve to execute the switching itself and cause the switching devices to pass signal portions to the mixer 96. The arrangement illustrated for deriving the preliminary gating pulses is as follows: Pulses, which are of a frequency corresponding to that produced by the pulse generator (e.g., 240 c.p.s.), are taken from the filter 106 and applied through cathode follower 126 and phasing control 127 to the amplifier 128. The phasing control permits a predetermined shift in phase between the pulses from the filter 106 and the output of the phasing control 127, for the purpose of adjusting the switching time with respect to the angular position of the rotary head. The output from the amplifier 128 is clipped at 129 and applied to the phase splitter 131, which provides pulses of opposite polarity and of substantially square wave form at its output terminals. Also pulses are applied from the phasing control 127 to the amplifier 132 through the 90° lag network 133. The output of amplifier 132 likewise is clipped at 134 and applied to a phase splitter 136 similar to splitter 131. As illustrated in Figure 1, one terminal of phase splitter 131 connects with a controlling element of switcher 91, and the other terminal is connected to a controlling element of switcher 92. One terminal of phase splitter 136 connects with a controlling element of switcher 93, and the other terminal connects with a controlling element of switcher 94.

In the system as illustrated the 480 cycle final switching signal can be derived from either one of two sources; namely, directly from the clipper 143 or from the output of the multivibrator 152, which is controlled by the 480 cycle conditioning signal (i.e. output of clipper 143) and the triggering pulses derived from the video output at 105. The multivibrator 152 is caused to change its polarity during some time interval immediately after the change in polarity of the 480 cycle conditioning signal derived from the photocell on the rotary head assembly. Once the conditioning wave has changed its polarity the multivibrator 152 will also change in response to the arrival of the next triggering pulse. The net result is that switching is accomplished during the horizontal retrace interval of the video signal, yet the approximate timing is still governed by the angular position of the rotary head assembly.

In standard American television practice, horizontal synchronizing pulses are of a frequency of 15.75 kc. For deriving conditioning pulses from the output of the rotary pulse generator, pulses from the phase control 127 are shown applied to the frequency doubler 141, the output of which is applied through the wave shaping filter 142 to the clippers and amplifiers 143. Assuming, for example, that the frequency supplied by the pulse generator 21 is 240 c.p.s., then the frequency applied to the clippers and amplifiers is 480 c.p.s.

If it is desired to switch without the retrace switching feature, the output of the clippers and amplifiers 143 can be applied through switch S3 directly to the clipper 144, and the substantially square wave form from this clipper is applied to the phase splitter 146. The pulses appearing at the output terminals of phase splitter 146 are of opposite polarity and are applied to additional control elements of the switching devices 91–94 in the manner indicated. Thus one terminal of phase splitter 146 connects with control elements of devices 91 and 93, and the other terminal connects with control elements of devices 92 and 94.

If the use of the retrace switching feature is desired, switch S3 can be positioned as shown in dotted lines, whereby the output of the clippers and amplifiers 143 is applied to the clipper 147 and phase splitter 148. The square wave form from 148 is applied to mixer 149, and the output from this mixer is amplified at 151 and applied to the multivibrator 152. The multivibrator is of the type triggered by a series of applied negative pulses and produces output pulses at a frequency corresponding to the frequency from the doubler 141 (e.g., 480 c.p.s.) for application through switch S3 to the clipper 144.

Demodulated signal from the video amplifier 105 is applied to the amplifier 153, the output of which connects with the synchronizing pulse stripper 154. This stripper is a highly selective amplitude discriminator which passes the synchronizing pulses but rejects video.

The output of the synchronizing pulse stripper 154 (e.g., 15.75 kc.) is applied to drive the multivibrator 156, the output of which is applied through the wave shaper 157 to the amplifier 158. The output of this amplifier is applied to the mixer 149. The square wave (e.g., 480 c.p.s.) from the clipper 147 is applied by the phase splitter 148 in opposite polarities to the incoming triggering pulses from the sync-pulse multivibrator 156. The vacuum tubes of amplifier 151 are so biased that they go into cutoff whenever the incoming waves from 149 are negative in polarity. Therefore the amplifier 151 forms a gating means permitting triggering pulses to pass to the multivibrator 152 only when a positive portion of the 480 cycle square wave is being applied simultaneously to the same. For the frequency values previously mentioned by way of example, the output signal from the amplifier 151 is a series of negative synchronizing pulses approximately two microseconds in length. Only the first of such sync-pulses for each positive portion of the 480 cycle conditioning wave is effective in triggering the multivibrator 152. The multivibrator 152 is synchronized in such a manner as to deliver at its output a signal that is always of the same polarity as the conditioning signal. In point of time the leading and trailing wave fronts of the output from the multivibrator 152 bear an accurate predetermined relationship to the synchronizing pulses in the video output. As illustrated in Figure 1, the output from multivibrator 152 is applied through clipper 144 and phase splitter 146, to the switching devices 91–94, and as will presently be explained, the use of such accurately formed pulses makes it possible to cause the switch point or transition from one transducer unit to another to be invisible insofar as the reproduced video image is concerned.

Figure 4:
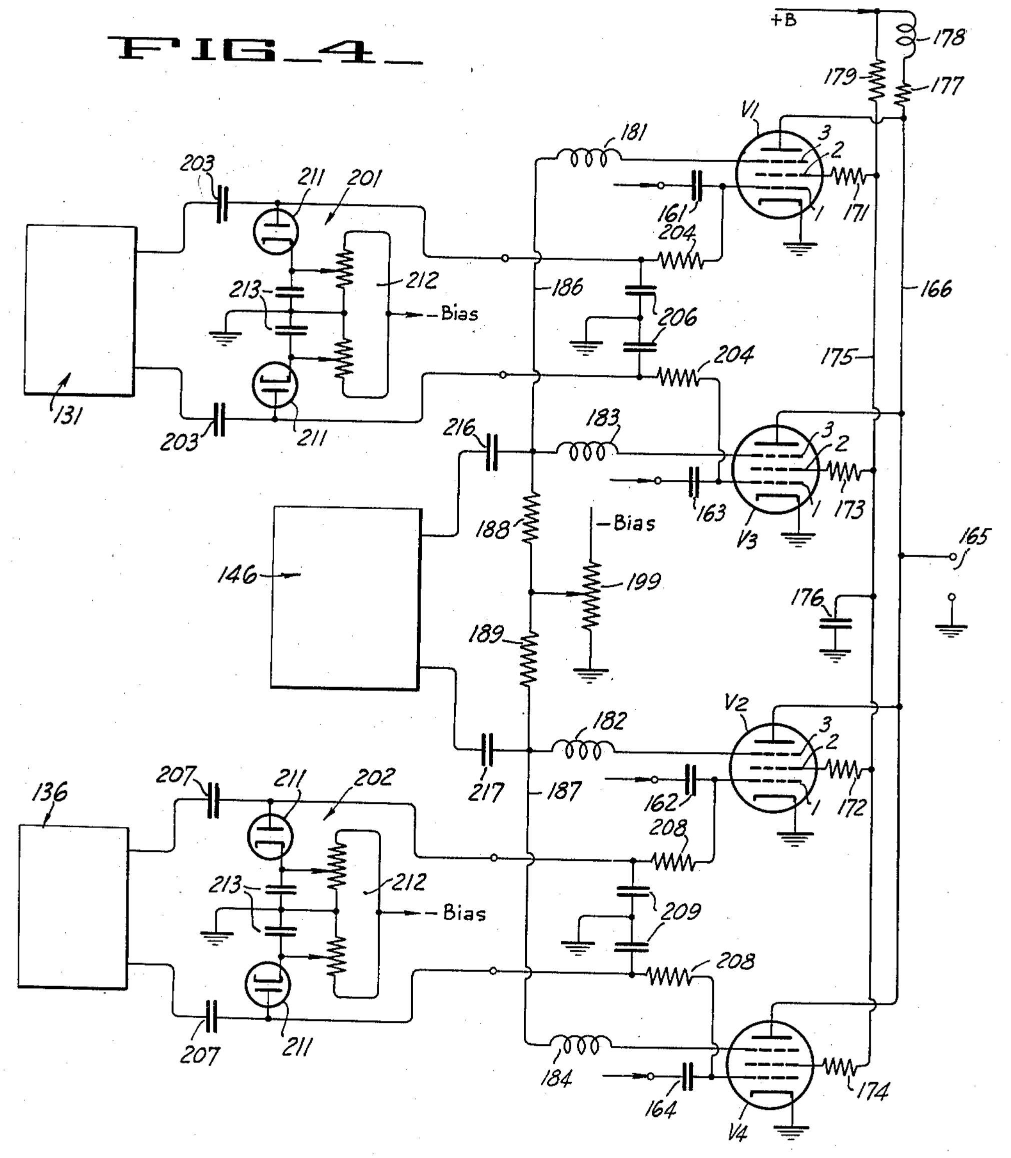
Figure 4 is a circuit diagram showing a particular type of switching means.

Figure 4 illustrates vacuum tubes and associated circuitry for forming the switching devices 91–94. The actual switching operations are performed by the multigrid vacuum tubes V1, V2, V3, and V4, which may be of the type known by manufacturers' specifications as 6BN6. The control grids 1 of each tube are in each instance coupled to input terminals through condensers 161–164. These terminals connect with the delay lines 81–84. A common output 165 has its one conductor 166 directly connected to the plates of the tubes V1, V2, V3, and V4. The screen grids 2 of all of the tubes are connected through grid resistors 171–174 with a common lead 175. A bypass condenser 176 connects between lead 175 and ground. Lead 175 connects to the source of plate voltage through the resistor 179, whereby a proper positive bias is maintained on all of the screen grids. Lead 166 is connected to a source of plate current through resistor 177 and choke 178. The suppressor grids for tubes V1 and V3 are connected to a common lead 186, through the chokes 181 and 183. The suppressor grids for tubes V2 and V4 are similarly connected with a common lead 187, through the chokes 182 and 184. Both leads 186 and 187 are connected to a source of negative bias, as for example, through the resistors 188 and 189 and potentiometer 199, which has its two terminals grounded and connected to a source of negative bias respectively.

The output of the phase splitter 131 is shown coupled to the control grids 1 of the tubes V1 and V3, through the coupling condenser 203 and the resistors 204. Corresponding terminals of resistors 204 are bypassed to ground for video carrier frequencies through the condensers 206.

The output of phase splitter 136 is similarly coupled to the control grids of the tubes V2 and V4. Coupling in this instance is through condensers 207 and resistors 208, and corresponding terminals of resistors 208 are connected to ground through the bypass condensers 209.

Clamping means is preferably associated with the outputs of each of the phase splitters 131 and 136. The clamping means illustrated in each instance consists of diodes 211 having their plates connected to the leads extending to the control grids, and having their cathodes connected to a negative bias voltage through the potentiometers 212. One terminal of each potentiometer connects to ground and the other terminals are directly connected to a source of negative voltage. Each cathode is also connected to ground through a bypass condenser 213. The potentiometers and the diodes act as D.C. restorer circuits which clamp the positive going portions of the 240 c.p.s. wave to the desired operating bias for the tubes V1–V4.

The terminals of the phase splitter 146 are coupled to the leads 186 and 187 through the condensers 216 and 217. Chokes 181–184 are of such values that they optimize the rise times of voltage pulses to the suppressor grids 3 in accordance with the voltage excursions of the output of phase splitter 146.

Each of the tubes V1–V4 is operated in such a manner that a signal applied to its control grid will not be passed unless both the control grid and the suppressor grid 3 are driven positive with respect to cutoff potential. Assuming the values previously mentioned by way of example for video practice, the phase splitters 131 and 136 supply pulses at a frequency of 240 c.p.s., although the wave for phase splitter 136 is 90° lagging with respect to the output from splitter 131. For one half cycle of the wave from phase splitter 131 the control grid 1 for tube V1 is driven from cutoff into the region of operating bias while the control grid for tube V3 is driven negative. For the next half cycle the control grid for tube V1 is driven negative, while the control grid for tube V3 goes into the operating bias region. 90° after the control grid of tube V1 goes positive, the control grid for tube V2 is likewise driven positive, and 90° after the control grid for tube V4 is likewise driven positive. The square wave from splitter 146 is at a frequency of 480 c.p.s., and for one half cycle of this frequency, lead 186 is driven positive and lead 187 negative and for the remaining half cycle the polarity is reversed. If the control grid 1 for tube V1 is biased in the operating region, coincident application of a positive bias upon the suppressor grid 3 of this tube causes tube V1 to conduct any signal applied to the control grid 1. Grid 3 remains positive only for a sufficient interval to repeat the desired signal portion, and this period is terminated by suppressor grid 3 going negative. The instant the suppressor grid 3 of tube V1 goes negative the suppressor grid of tube V3 goes positive, and this, together with the positive condition of the control grid 1 for this tube, makes this tube conduct, or in other words, repeats the signal applied to the same. Similarly tubes V3 and V4 become conducting after which the switching cycle is completed back to tube V1.

Figure 5:
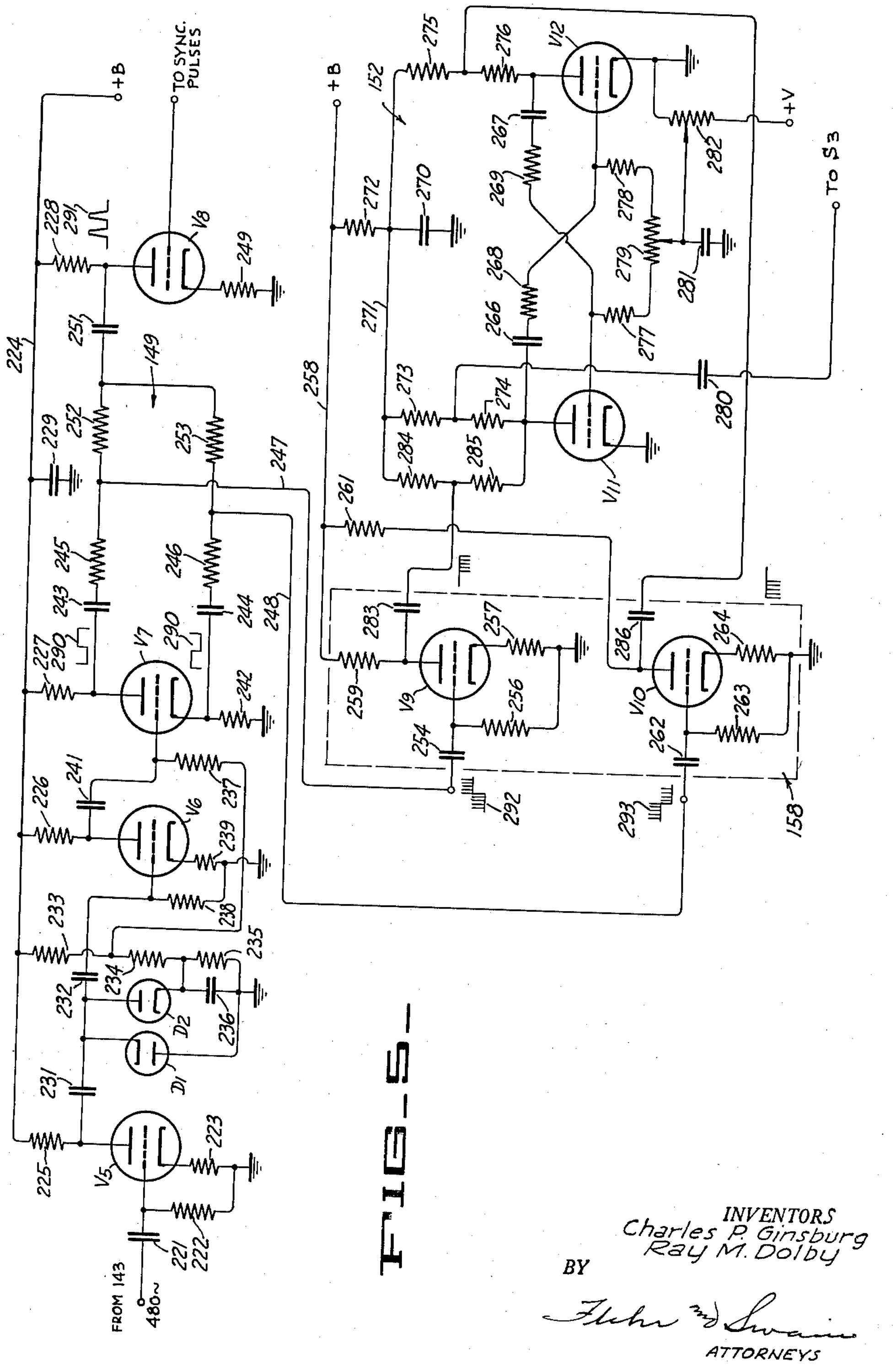
Figure 5 is a circuit diagram showing means for deriving retrace switching waves.

Figure 5 shows suitable circuitry for the mixer 149, multivibrator 152, and associated equipment. The 480 cycle square wave from 143 (Figure 1) is applied to the amplifier V5 and is clipped by the diodes D1 and D2. The signal is again amplified by V6 and is applied to the control grid of the phase splitter V7. Each of the outputs of V7 is mixed with the sync-derived pulses coming from amplifier 158 as shown in Figure 1. The two mixed outputs are now applied to the control grids of V9 and V10 (Figure 5).The outputs of these amplifiers trigger the multivibrator 152. More specifically, the input to tube V5 is coupled through condenser 221 to the control grid of tube V5, the grid leak resistor 222 being connected to ground. The cathode connects to ground through the biasing resistor 223. Tubes V5, V6, V7 and V8, all have their plates connected to the common plate voltage supply lead 224 through resistors 225–228, and this lead is bypassed to ground through condenser 229. The cathodes and the plates of diodes D1 and D2 respectively are connected together and coupled to the plate of tube V5 through condenser 231. Also, they are coupled to the control grid of tube V6 through condenser 232. The connected resistors 233, 234, and 235 have their two remote terminals grounded and connected to lead 224 respectively. Resistor 235 is bypassed by condenser 236, and the cathode of diode D2 is connected to the point of connection between resistors 234 and 235. The point of connection between resistors 233 and 234 is connected to the control grid of tube V7 through resistor 237. The control grid of tube V6 is grounded likewise through grid leak resistor 238, and the cathode is connected to ground through biasing resistor 239. The control grid of tube V7 is coupled through condenser 241 to the plate of tube V6. The cathode of tube V7 is connected to ground through the biasing resistor 242. Condensers 243 and 244 couple the plate and cathode respectively of tube V7 to the resistors 245 and 246, which connect with the mixer output leads 247 and 248.

Tube V8 has its control grid coupled to the output of the wave shaper 157, whereby it receives pulses derived from the synchronizing pulses. The cathode of this tube connects to ground through the biasing resistor 249. The plate of tube V8 is coupled through condenser 251 with the resistors 252 and 253, which likewise connect with the output leads 247 and 248 respectively.

Condenser 254 couples the control grid of tube V9 to lead 247, the grid leak 256 being connected to ground. The cathode connects to ground through biasing resistor 257. The plates of both tubes V9 and V10 connect to the plate current supply lead 258 through the resistors 259 and 261. Tube V10 similarly has its control grid coupled to lead 248 by condenser 262, the grid leak 263 being connected to ground. The cathode connects to ground through biasing resistor 264.

The multivibrator formed by the tubes V11 and V12 includes the main operating condensers 266 and 267 cross connected in series with resistors 268 and 269, which make the output wave more nearly square. A lead 271 connects to the plate current supply lead 258 through resistor 272 and connects with the plate of tube V11 through resistors 273 and 274 and with the plate of tube V12 through resistors 275 and 276. Bypass condenser 270 connects between lead 271 and ground. The control grids of tubes V11 and V12 are biased through grid leak means including the two resistors 277 and 278, together with the resistor of the potentiometer 279. The tap of this potentiometer is bypassed to ground through condenser 281 and connects to the movable contact of a second potentiometer 282 having its one terminal connected to the cathode of tube V12, and its other terminal connected to a source of biasing voltage. This arrangement permits an adjustment of the free running frequency as well as the symmetry of the output wave.

The plate of tube V9 is coupled to the multivibrator through condenser 283 and the resistors 284 and 285. These resistors connect between the plate of tube V11 and the lead 271. The plate of tube V10 is coupled to the multivibrator through condenser 286, which connects with the point of connection between resistors 275 and 276.

The circuitry shown in Figure 5 operates as follows: Assume application of synchronizing pulses to the grid of the tube V8 from the wave shaper 157, and again assume that the frequency of these pulses is 15.75 kc. The pulses may appear substantially as indicated at 291 on the plate of tube V8. A square wave 290 at a frequency of 480 c.p.s. appears on the leads from the plate and cathode of tube V7 as indicated. The wave form as it appears on the leads 247 and 248 is indicated at 292 and 293 and illustrates how the 480 cycle square wave is added in opposite polarities to the pulses applied from tube V8. The grid leak resistors for the tubes V9 and V10 are of such values that these tubes are driven beyond cutoff when the incoming 480 cycle wave is negative in polarity. Therefore, the triggering pulses, derived from the video synchronizing pulses, can pass through these tubes only when the 480 cycle wave form is positive. The output from tubes V9 and V10 is as indicated, a series of negative triggering pulses approximately 2 microseconds in length.

The multivibrator is triggered by the first of the 15.75 kc. pulses applied from the tubes V9 and V10. It is synchronized in such a manner that it delivers to its output terminals a signal that is always of the same polarity as that of the conditioning wave.

Figure 6:
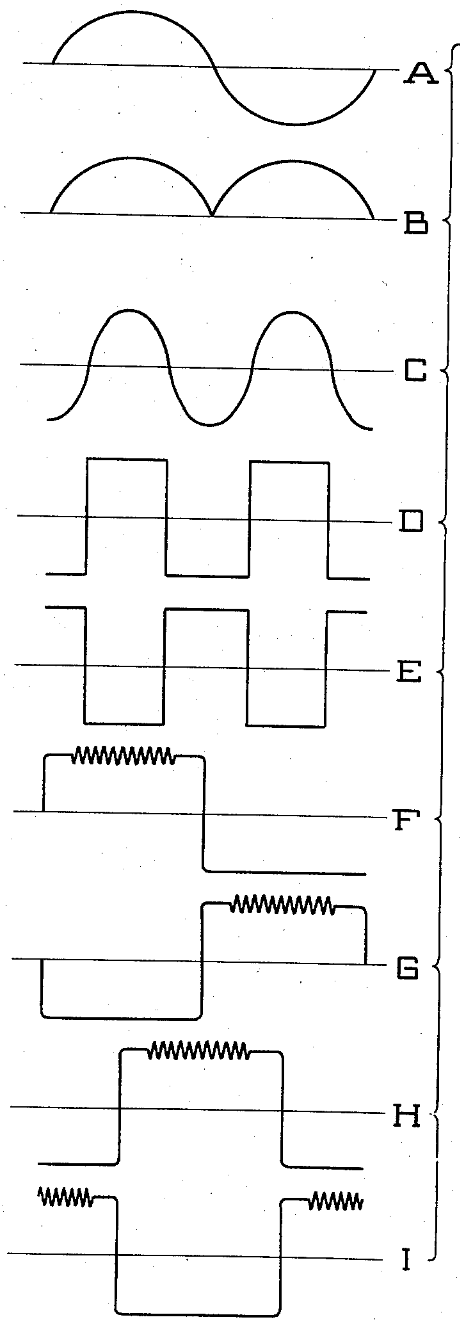

With reference to the wave forms of Figure 6, the wave form A represents the sine wave from the phasing control 127 which, for the values previously assumed, is a frequency of 240 c.p.s. Wave form B represents the output of the frequency doubler 141, and wave form C represents the sine wave from the filter 142 at a frequency of 480 c.p.s. Wave form D represents the voltage applied to the suppressor grids of tubes V1 and V2 from the phase splitter 146. Figure 4E represents the wave applied to the suppressor grids of tubes V2 and V4 from the phase splitter 146. Figures 6F, G, H, and I, represent respectively the wave forms at the control grid of tube V1, the wave form at the control grid of tube V3, the wave form at the control grid of tube V2, and the wave form at the control grid of tube V4. The relatively high signal frequency appears on the wave forms of Figures 6F–I. This represents periods in which the tubes V1–V4 are made successively conducting to pass signal portions to the common output circuit, thereby forming a continuous combined signal. Note that the high frequency signal appears only on the positive portions of these wave forms.

At the control grid of tube V1 the RF signal appears at the top central portion of the square wave form. As shown in Figure 4 the wave form at the suppressor grid of tube V1 is going positive within a short interval (e.g., 100 microseconds) after the RF signal appears at the control grid of tube V1. The 480 cycle square wave on the suppressor grid of tube V1, together with properly biased signal at the control grid of tube V1, causes this tube to conduct or repeat, whereby the resulting signal appears in the common output circuit 165. The next RF signal appears at the control grid of tube V2. The 480 cycle square wave is next applied to the suppressor grid of tube V2, and at the same time tube V1 is turned off so that tube V2 is the only one conducting during the time that the signal is coming through this channel from the tape. Similarly the switching passes through its sequence, namely through tubes V1, V2, V3, and V4 becoming successively conducting. Figures 6F to 6I inclusive illustrate how the RF signal portions appearing in the output will, after switching, form a substantially continuous signal which is subsequently demodulated.

Figure 7 illustrates a portion of a typical magnetic tape 11 with recorded tracks or areas upon the same. The areas 301 (exaggerated as to width and spacing) represent the rectilinear track areas which are swept by the magnetic heads, and these areas are slightly spaced apart in the direction of the length of the tape and are disposed at an angle slightly less than 90° with respect to the length of the tape. By way of example, where the magnetic tape is two inches in width, each recorded area may have a width as measured lengthwise of the tape of about 10 mils. Dotted lines 302 and 303 represent the demarcation between the tracks which carry the picture intelligence and the marginal edge portions over which erase heads 1 and 3 are operated. Erase head 1 is shown operating immediately in advance of the head 2 during recording. On the other margin of the tape head 3 can function as an erase head in advance of the head 4. Head 4 can be used for the recording of sound signals. Shortly before a transducer unit reaches the line 303 a succeeding head reaches the line 302. In Figure 7 it is assumed that the lower marginal edge is being used for the recording of audio frequencies and the other margin for recording the control frequency. In both instances the erase operations performed by heads 1 and 3 eliminate most, but not all of the track portions carrying duplicate picture information. The remaining portions 301 of the recorded areas are slightly overlapping in point of time, and it is within the limits of the overlap that the switching operations take place.

The delay lines function in the manner described in copending application Serial No. 552,868, filed December 13, 1955. Briefly, during playback operations the delay lines 81–84 can be individually adjusted to compensate for any differences in angularity between the transducer units used for recording and the units used for reproduction. Such difference in angularity is evidenced by lateral shifting between horizontal bands of the picture. Preferably on recording, the delay lines 61–64 are adjusted with respect to each other until corrections have been made to compensate for inaccuracies due to differences in angularity, so that the tape will appear to have been recorded by heads in proper alignment. In general, the adjustment of the delay lines used with the record electronics will be in a reverse or complementary sense to the adjustments for the delay lines forming a part of the playback electronics.

Adjustments can also be made to compensate for the fact that the transducer tips in the playback apparatus have a sweep radius slightly different from the sweep radius for the apparatus used for recording. As described in said copending application Serial No. 552,868, filed December 13, 1955, such adjustment is carried out by adjusting the degree of partial vacuum applied to the grooves 34. Assume that for playback the same partial vacuum is used as for recording and that in both instances the motors connected to the supply reels 12 apply equal back torque, then the pressure with which each head tip contacts the tape is the same. This, of course, assumes that the radius of each transducer tip is the same. When a partial vacuum applied to the grooves 34 is increased the frictional drag of the tip across the holders increases, and there is an increase in the tension applied to the tape in the direction of its length, having reference particularly to that portion of the tape which spans the recess 40. Such increase in tape tension increases the effective pressure between the tape and the tip of each head, with the result that in the region of contact of a head tip the indentation of the tape is correspondingly increased. This has the effect of causing a stretch of the tape in the localized region of contact with a tip and such a stretch in effect increases the length of the track for a complete sweep. It will be evident that this type of adjustment serves to compensate for wear of the tips of the heads in a particular playback machine, or it may be used to compensate for a slight difference between the playback equipment and the equipment used for recording. Also it may compensate for variations in tape width which may occur between periods of recording and reproduction. As previously explained the changes in partial vacuum can be made by adjusting the setting of the bleed-in valve 39.

Instead of, or in conjunction with, adjusting the partial vacuum applied to grooves 34, the entire holder 29 may be adjusted toward or away from the axis of the wheel 22 by means of the adjusting screw 33. Although this type of compensating adjustment is accompanied by certain non-linearities, these non-linearities over a limited range of operation are small in comparison to the errors for which they correct. Such adjustment of the holder can be applied either by itself or in conjunction with the adjustment of the vacuum.

Previous mention has been made of our preference for F–M recording. The type of F–M recording which can be used for satisfactory recording and reproduction of visual images (i.e. TV recording) is disclosed in copending application Serial No. 524,004, filed July 25, 1955. It is also described in said copending application Serial No. 552,868, filed December 13, 1955. By way of example, it is satisfactory for television recording to employ a center frequency of 4.5 megacycles together with a relative head-to-tape velocity of about 1500 inches per second. The recording method can be described as vestigial sideband FM recording with the carrier frequency located in the upper end of the spectrum which the system is capable of handling. Thus a gradual attenuation of the upper sidebands is brought about through the action of the head and tape system. The system employs relatively narrow band frequency modulation recording. If $\Delta f$ represents deviation corresponding to maximum signal amplitude, and $f_m$ represents the highest modulating frequency, the ratio of $\Delta f$ over $f_m$ is relatively small, being in the order of 0.2. The frequency deviation from the center frequency can be such that the carrier frequency of 4.5 megacycles may depart from its center value by about 1 megacycle when the amplitude of the modulating signal is at its highest value. Alternatively a modulation system may be employed in which the rest frequency of the carrier is made to correspond with a given signal portion of the composite television waveform. For example, the grids of the multivibrator may be clamped to a D.C. level corresponding to the peak of the synchronizing pulses. In this case, the center frequency would be considerably above the rest frequency.

As will be evident to those familiar with television systems, an input of video frequencies can be obtained from a standard television receiver or may be taken directly from the output of the camera chain. Similarly the reproduced video output can be used to produce a visual image by utilizing an ordinary television receiver, including the synchronizing pulse and scanning auxiliaries and the amplifying means ordinarily associated with the same.

The nomenclature which we employ for the system of Figures 1–3, with reference to the various waves and pulses, can be summarized as follows: The 240 cycle wave, derived from the photoelectric pulse generator associated with the head assembly, and controlled in phase by the switcher phasing control 127, is termed the preliminary gating wave. The 480 cycle wave, likewise derived from the photoelectric generator and controlled in phase by the switcher phasing control is referred to as the conditioning wave. The pulses obtained from the composite video signal by stripping and which are used to generate the triggering pulses, are referred to as video synchonizing pulses. The pulses derived from the video synchronizing pulses and controlled in time delay with respect to the synchronizing pulses, and which are used to control the instant of polarity change of the retrace switching wave, are referred to as the triggering pulses. The 480 cycle wave derived from the conditioning wave and the triggering pulses, and which executes the switching operation when switch S3 is in the position shown by dotted lines, is a special switching wave referred to as the retrace switching wave. When the retrace switching wave is not being used, and switch S3 is in the position shown by solid lines, the conditioning wave becomes a switching wave. The wave derived from the photoelectric pulse generator, is in synchronism with the rotation of the head assembly, and therefore in synchronism with the sweeps of the magnetic heads across the tape. Therefore it is correct to state that this wave is derived from the incidence frequency with which the heads sweep across the tape, or more generally to the incidence frequency of the signal portions in the output leads from the individual magnetic heads.

Overall operation of the system is as follows: Assume the use of the same equipment for recording and subsequent playback, the tape is driven by the motor M across the rotary head assembly whereby it is swept by the tips of the heads in the manner previously described. Immediately thereafter the heads 1 and 3 may erase marginal edges of the tape, head 2 records the control frequency, and head 4 may record a sound channel. After a record has been made the tape is again run through the machine with the switch S1 switched to connect the preamplifiers 71–74. The signal portions applied to the four channels represented by the preamplifiers are applied to the switching devices 91–94, and successive portions are passed by the switching devices and the mixer 91 to the common output. The common output is demodulated to provide the video output.

The switching devices 91–94 are successively operated in the special manner previously described. Each switching tube first has a positive preliminary gating pulse applied to its control grid, and thereafter a positive pulse is applied to its suppressor grid to make the tube conductive and to cause the tube to remain conducting for a time period sufficient to pass the desired signal portion from one head (i.e. transducer unit) as it passes across the tape. When switch S3 is in the position indicated in solid lines the actual switching waves are derived from the rotary pulse generator that is associated with the rotary head assembly. When switch S3 is positioned as shown in dotted lines the switching pulses are derived from the conditioning pulses and the video synchronizing pulses as well. Utilizing pulses derived from the video synchronizing pulses is advantageous for the following reasons. When switch S3 is positioned whereby the synchronizing pulses are not utilized, the points of switching cause the appearance of random spots upon the reproduced image. When switch S3 is positioned to make use of synchronizing pulses in the manner described the dots upon the reproduced image representing the switching points are brought into vertical alignment, and by adjusting the phase of the triggering pulses applied to V8 the transients can be moved off the left-hand margin of the screen. In other words, switching can be made to occur on the so-called back porch of the resultant video signal.

In addition to the foregoing and irrespective of the positioning of the switch S3, the use of multichannel sequential switching is advantageous. The use of separate playback channels, one for each unit of the head, together with switching, tends toward maintaining a favorable signal-to-noise ratio in that only the channel which is contributing signal adds noise as well; all other sources of noise in the other three channels are disconnected.

In one particular instance, and by way of example, the circuit of Figure 4 was constructed as follows: The vacuum tubes V1–V4 were identified by manufacturers' specifications as 6BN6. All of the diodes 211 were identified as T6G. The various potentiometers and resistors had values as follows: 212, 10K (K equals 1000 ohms); 204 and 208, 15K; 188, 189, 47K; 199, 10K; 171–174, 27 ohms; 177, 560 ohms; and 179, 15K. The various condensers had values as follows: 203 and 207, 0.25 mfd.; 216 and 217, 0.25 mfd.; 206 and 209, 0.001 mfd.; 161–164, 100 mmf.; 176, 8 mfd. The inductances 181–184 were each 10 $\mu h$; and inductance 178, 10 $\mu h$. The plate (B+) voltage was 250 v.

In conjunction with the specific example of Figure 4 described above, Figure 5 was constructed as follows: Tubes V5 and V6 were each one-half of a No. 12AT7 tube, and likewise V7 and V8, V9 and V10, and V11 and V12. The resistors employed had values as follows: 222, 680K; 223, 270 ohms; 225, 15K; 233, 100K; 234, 15K; 235, 3.9K; 226, 6.8K; 238, 680K; 239, 270 ohms; 237, 680K; 227, 4.7K; 242, 4.7K; 245 and 246, 22K; 252 and 253, 22K; 228, 4.7K; 249, 270 ohms; 259 and 261, 1.5K; 256 and 263, 10 m. (megohms); 257 and 264, 68 ohms; 284, 2.2K; 285, 10K; 273, 560 ohms; 274, 6.8K; 275, 2.2K; 276, 2.7K; 268 and 269, 22K; 277 and 278, 390K; 282, 20K; 272, 1K. The various condensers had values as follows: 221, 0.1 mfd.; 231, 0.25 mfd.; 232, .1 mfd.; 236, 10 mfd.; 241, .1 mfd.; 243 and 244, 0.25 mfd.; 251, .001 mfd.; 254 and 262, 0.1 mfd.; 283 and 286, 0.002 mfd.; 266 and 267, 0.002 mfd.; 270, 20 mfd.; 281, 10 mfd. Leads 224 and 258 were connected to a source of plate battery voltage at 250 volts. The bias voltage connected to resistor 282 was 25 volts.

As previously stated it is generally desirable to utilize separate channels (with individual switching devices) corresponding to each of the heads of the head assembly. It is possible however to use a simplified system in which the heads are connected in pairs, and the pairs connected to a single channel. For example, with a head assembly using four heads, diametrically opposite heads can be connected to a single channel, thus providing two instead of four channels. In such event it is possible to utilize a simplified switching arrangement, although still using the retrace switch wave for operating the switching devices. Such a simplified arrangement is schematically illustrated in Figure 8. The outputs of the delay lines 81–84 are connected in pairs to form two channels, which connect with the electronic switching devices 311 and 312. The phase splitter 146 (corresponding to the splitter 146 of Figure 1) is connected to the two switching devices as illustrated. The vacuum tubes of the switching devices can be such that the signal is applied to a control grid, and the pulses from phase splitter 146 applied to another grid whereby the tube is made conducting and nonconducting, to pass the signal to the mixer 96. As explained in connection with Figure 1, the output of phase splitter 146 is a retrace switching wave, derived from the conditioning wave and from the triggering pulses that are in turn derived from the video synchronizing pulses.

We claim:

1. In an electronic system wherein signal portions that are time spaced and partially overlapping are combined to form a substantially continuous signal, means forming a plurality of separate input channels to which the signal portions are applied successively, output means for receiving the combined signal, electronic switching means disposed between each of the input channels and the output means to connect a corresponding channel to the output means, each of said switching means being responsive to coincident application of a preliminary gating pulse and a switching pulse of like polarity, the output of each switching means being electrically isolated from the inputs of the other switching means, means for producing preliminary gating pulses, means for applying said preliminary gating pulses to said switching means, means for producing said switching pulses, and means for applying said switching pulses to the switching means, said switching means serving sequentially to connect said input channels to said output means thereby to produce a composite output signal.

2. An electronic system as in claim 1 in which the means for producing preliminary gating pulses derives such pulses from the incidence frequency of the signal portions.

3. An electronic system as in claim 2 in which the means for deriving the switching pulses derives the same from the incidence frequency of the signal portions.

4. An electronic system as in claim 1 together with means for demodulating the composite signal and in which said means for producing switching pulses derives such pulses from a frequency in the demodulated signal.

5. A system as in claim 4 in which the means for producing preliminary gating pulses serves to derive the same from a frequency corresponding to the incidence frequency of the signal portions.

6. An apparatus for reproducing signals recorded magnetically upon a magnetic tape, wherein the signals are recorded on a plurality of track portions which overlap in point of time and which may be reproduced and combined to form a substantially continuous signal, means comprising a plurality of separate transducer units adapted to sweep over said track portions successively, means forming input channels separately connected to said transducer units to thereby receive current variations corresponding to said track portions, a common output means, and a plurality of electronic switching means interposed between each of the input channels and said output means, each switching means being responsive to coincident application of a preliminary gating pulse and a switching pulse of like polarity, and means independent of operation of said switching means for producing preliminary gating and switching pulses for application to said electronic switching means whereby said switching means electronically connects said channels successively to said output means.

7. A system as in claim 6 in which the means for deriving the preliminary gating pulses is controlled by the incidence frequency of the sweeps of the transducer units over said track portions.

8. An electronic system as in claim 7 in which the switching pulses are derived from the incidence frequency of the sweeps of the transducer units over said track portions.

9. In an electronic system wherein portions of a continuous signal are recorded upon a series of track portions on a magnetic tape, said track portions being overlapping in point of time, reproducing apparatus comprising a plurality of transducer units, means for sweeping said units successively over said track portions thereby providing current variations corresponding to the recorded signals, means forming a plurality of separate input channels connected to said transducer units, a common output means for all of said channels, demodulator means for producing a combined demodulated signal output, electronic switching means interposed between each of the input channels and the output means and adapted to be controlled to connect a particular channel to the output means, each switching means being responsive to coincident application of a preliminary gating pulse and a switching pulse of like polarity, means for producing preliminary gating pulses by deriving the same from the incidence frequency with which the transducer units sweep across the tape, means for applying said preliminary gating pulses to the switching means, means for producing said triggering pulses by deriving the same from the demodulated signal output, the triggering frequency being higher than the frequency of the preliminary pulses, and means for applying said triggering frequency to said switching means, application of both said preliminary and switching pulses to said switching means serving sequentially to connect said channels to said output means without signal portions overlapping in point of time, thereby producing a continuous demodulated output signal.

10. Apparatus as in claim 9 together with means for controlling the phasing of said preliminary gating pulses.

11. Apparatus as in claim 9 in which said means for producing triggering pulses serves to derive the same both from a wave from which said gating pulses are derived and from the demodulated signal output.

12. In an electronic system wherein portions of a continuous video signal are recorded upon a series of track portions on a magnetic tape, said track portions being overlapping in point of time, reproducing apparatus comprising a plurality of transducer units, means for sweeping said units successively over said track portions thereby providing current variations corresponding to the recorded signals, means forming separate input channels connected to said transducer units, a common output means for all of said channels, electronic switching means interposed between each of the input channels and the output means and adapted to be controlled to connect a particular channel to the output means, means for deriving a preliminary gating wave from the incidence frequency with which the transducer units sweep across the tape, said preliminary gating wave being controlled in phase, means for applying said preliminary gating wave to said switching means, means for deriving a conditioning wave from said incidence frequency, means for stripping synchronizing pulses from the output signal, means for deriving a switching wave from both said conditioning wave and said last named pulses, and means for applying said switching wave to said switching devices together with said preliminary gating wave, the switching means being responsive to coincident application of a preliminary gating pulse and a switching pulse of like polarity.

13. A system as in claim 12 in which the signals are video signals including video frequencies and horizontal scan synchronizing pulses.

14. In an electronic system wherein signal portions that are time spaced and partially overlapping and which contain synchronizing pulses and video frequency components, are combined to form a continuous composite video signal capable of reproduction to form an image on a video screen, means forming at least two channels to which the successive overlapping signal portions are applied selectively, output means for receiving the combined signal, switching devices disposed between said channels and the output means to successively connect the channels to the output means, means for demodulating the combined output to thereby provide a composite video signal, means for stripping synchronizing pulses from the demodulated video signal, means for deriving switching pulses from said synchronizing pulses and for applying the same to said switching devices to cause the same to successively connect the input channels to the output means, and means for adjusting the phase relationship between said switching pulses and the incidence frequency of the signal portions, whereby in the reproduced image transients caused by the switching operations can be shifted off of the screen.

15. An electronic system as in claim 14 in which said switching pulses are derived from said synchronizing pulses and from a conditioning wave which in turn is derived from the incidence frequency with which said signal portions are applied to the separate input channels.

16. In an electronic system wherein signal portions that are time spaced and partially overlapping are combined to form a continuous composite signal, means forming separate input channels to which the signal portions are applied successively, output means in which the signal portions are combined, electronic switching means disposed between each of the input channels and the output means to selectively connect each input channel to the output means, each switching device comprising a switching path gated by application of voltage pulses to two control elements operatively associated therewith, the output of each switching means being electrically isolated from the input of the other switching means, means for producing preliminary gating pulses and for applying the same to one of said elements of each of the switching devices, and means for producing switching pulses and for applying the same to the other ones of said control elements of the switching devices, application of said preliminary gating and switching pulses serving to successively connect the input channels to said output means.

17. An electronic system for reproducing a continuous signal of the type which includes synchronizing pulses and signal intelligence having a wide frequency spectrum from a series of recorded track portions on a magnetic tape, the record track portions being overlapping in point of time, comprising transducing means for successively transducing the track portions to provide current variations corresponding to the recorded signals of the track portions over successive and overlapping time periods, a common output, switching means responsive to switching pulses for causing successive application of current variations to said common output without overlap in point of time whereby the signals corresponding to the successive track portions are merged in the common output, means for producing pulses from the synchronizing pulses in the reproduced current variations corresponding to the recorded signals, and means for producing switching pulses in response to said last pulses, said switching pulses being applied to the switching means for controlling the switching whereby the switching occurs in timed relationship with respect to the synchronizing pulses.

18. Apparatus as defined in claim 17 wherein said switching pulses comprise a switching wave derived from a wave form which in turn is derived from the incident frequency with which said transducing means transduces the track portions, and the pulses derived from the synchronizing pulses.

19. Apparatus as defined in claim 17 wherein said switching means is responsive to the application of said switching pulses coincident with preliminary gating pulses, and means for deriving preliminary gating pulses for application to said switching means having a frequency corresponding to the incident frequency with which said transducer means transduces said record tracks.

20. Apparatus as defined in claim 17 wherein said continuous signal has video frequency and synchronizing pulse components, and in which means are provided for adjusting the phase of the switching pulses whereby the points of switching are caused to occur on the back porch of the video signal.

References Cited in the file of this patent

UNITED STATES PATENTS

| | | |
|---|---|---|
| 2,245,286 | Marzocchi | June 10, 1941 |
| 2,485,886 | Johnstone | Oct. 25, 1949 |
| 2,577,141 | Manchly el al. | Dec. 4, 1951 |
| 2,698,875 | Greenwood | Jan. 4, 1955 |